United States Patent
Schürhörster

Patent Number: 6,117,017
Date of Patent: Sep. 12, 2000

[54] INSERTABLE TOOTHED COUPLING

[75] Inventor: Josef Schürhörster, Rheine, Germany

[73] Assignee: KTR Kupplungstechnik GmbH, Rheine, Germany

[21] Appl. No.: 08/929,340

[22] Filed: Aug. 28, 1997

[30] Foreign Application Priority Data

Jan. 11, 1997 [DE] Germany ................. 297 00 397 U

[51] Int. Cl.⁷ .................................................. F16D 3/50
[52] U.S. Cl. ......................................... 464/92; 464/903
[58] Field of Search ............................... 464/87, 88, 92, 464/95, 903

[56] References Cited

U.S. PATENT DOCUMENTS

| | | | |
|---|---|---|---|
| 2,051,442 | 8/1936 | Geyer | 464/92 |
| 2,444,904 | 7/1948 | Worley | 464/92 |
| 2,785,580 | 3/1957 | Andrwes | 464/88 |
| 3,742,656 | 7/1973 | Amos | 464/88 |
| 5,382,194 | 1/1995 | Scherner et al. | 464/92 |
| 5,429,552 | 7/1995 | Scherner et al. | 464/92 |

Primary Examiner—Lynne H. Browne
Assistant Examiner—Greg Binda
Attorney, Agent, or Firm—Darby & Darby

[57] ABSTRACT

An insertable axially, radially and angularly movable toothed coupling to enable the elastic transfer of torque from a drive motor to a machine which is to be driven, the coupling including a fastening flange (1), which, by means of an annular element (2) made of elastomeric material and subjected to torsional shear, is connected to an internally toothed coupling sleeve (3) made of plastic, by vulcanization, in such a way that the input and acceptance of the torque takes place at the spline engagement of the driving and driven elements, a coupling hub (4) made of steel which, by means of external teeth (5), grips the teeth of the coupling sleeve and, by means of internal splines (6), is connected form-fittingly and detachably to the shaft of the machine to be driven, so that the coupling hub and the coupling sleeve are adjacent to each other with annular offset surfaces (7, 8) and are secured against axial displacement by means of a retaining ring (9).

8 Claims, 1 Drawing Sheet

INSERTABLE TOOTHED COUPLING

FIELD OF THE INVENTION

This invention relates to an insertable axially and angularly movable toothed coupling which enables the elastic transfer of torque from a drive engine to a machine which is to be driven.

BACKGROUND OF THE INVENTION

Torsionally elastic couplings with elements for the compensation of radial, axial, and angular dislocations of the connected machines are known and include a number of constructions in which the torque transfer is made possible by annular rubber elements which are subjected to torsional shear. The use of torsional-shear elements creates great possibilities for radial misalignment with relatively small restoring forces. The annular rubber element making the radial misalignment possible connects two steel flanges which can be connected with the drive engine and which, in addition, are connected by screws to an internally splined coupling sleeve. An externally toothed coupling hub mounted on the machine to be driven grips the coupling sleeve. The assembly of the coupling, however, requires openings in the housing of the drive engine. In addition, the fastening work is complicated, requiring proper positioning and torque tightening, and therefore time-consuming.

In order to remedy this situation, DE 37 02 778 C2 discloses, for connecting machine combinations between which an elastic transfer of torque is to take place, a coupling in which the coupling parts previously mounted on the machines are inserted one into the other.

In the case of another insertable axially and angularly movable toothed coupling with a fastening flange detachably connected to the drive engine and a coupling hub which can be fastened to the machine to be driven, several concentric coupling parts which can be inserted into one another and which form an integral component are provided for the elastic transfer of torque. Of these, the inner part is constructed as a rigid coupling hub, and the outer part is constructed as a fastening flange made of a highly elastic material. In addition, by means of a special external contour, great flexibility of the fastening flange is achieved.

SUMMARY OF THE INVENTION

The present invention is designed to solve the problem of creating an insertable coupling to enable the highly elastic transfer of torque which, completely preassembled, can be mounted on the drive engine without any aligning tools and compensates for axial shaft misalignment by means of the insertion connection, and which is easily manufactured. This problem is solved by means of an insertable axially and angularly movable toothed coupling for the elastic transfer of torque, which is provided with a fastening flange which is detachably connected with the drive engine and which, by means of an annular element made of elastomeric material and subjected to torsional shear, is connected, for example, by vulcanizing, to an internally splined plastic coupling sleeve in such a way that the input and acceptance of the torque take place at the axial ends of the elastomeric element; in addition, the coupling is provided with a steel coupling hub which grips the teeth of the coupling sleeve and which is connected form-fittingly and detachably, by means of internal splines, to the shaft of the machine being driven, in such a way that the coupling hub and the coupling sleeve are adjacent to each other, with annular offset surfaces, and are secured against axial displacement by means of a safety ring.

The coupling hub is preferably made from an externally profiled bar material. In accordance with another advantageous feature, recesses are provided at the external circumference of the annular elastomeric element to accommodate the fastening screws for the fastening flange of the coupling. These recesses make it possible to arrange the fastening screws within the external circumference of the elastomeric element in such a way that the fastening flange is also kept small in diameter so that a very compact construction is achieved.

The coupling can be mounted in a completely preassembled state. The drive engine is connected in a power-transmitting manner by means of a simple insertion assembly process to the machine to be driven (e.g., a pump shaft). Thus, positioning of the coupling hub on the pump shaft becomes unnecessary and it is possible to fasten the pump directly onto the engine housing. The assembly work is thereby limited to bolting the fastening flange of the coupling onto the flywheel of the drive engine. All that is required now for the connection is to push the pump shaft into the coupling hub, as there is no need to fasten the hub directly onto the shaft.

BRIEF DESCRIPTION OF THE DRAWINGS

The present invention will now be described in detail with particular reference to the accompanying drawings.

DETAILED DESCRIPTION OF THE PREFERRED EMBODIMENT

Figure 3:
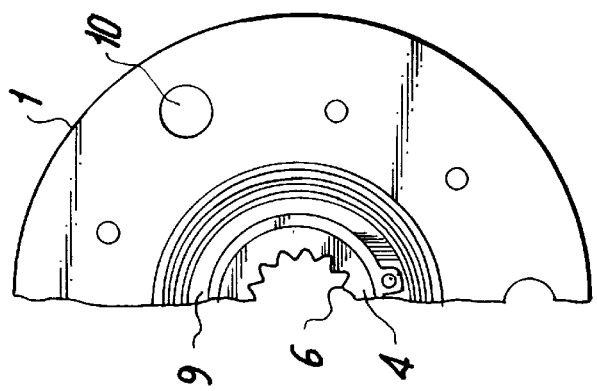
FIG. 3 is a rear plan view showing one-half of the coupling.
Figure 2:
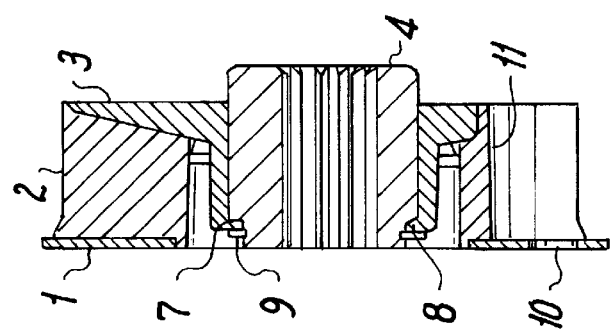
FIG. 2 is a sectional view taken along lines 2—2 in FIG. 1.
Figure 4:
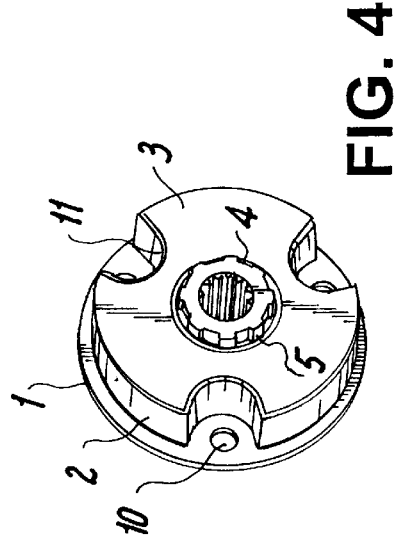
FIG. 4 is an isometric diagrammatic representation of the coupling.
Figure 1:
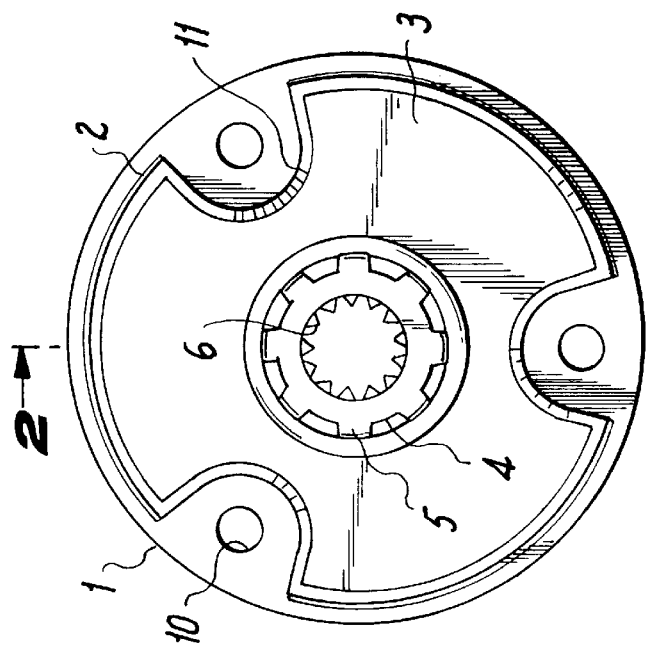
FIG. 1 is a frontal plan view of a coupling according to the present invention oriented toward the machine to be driven.

With reference now to the drawings, the fastening flange 1 of the coupling, made from, for example, steel, is connected by means of an annular torsionally elastic element 2 made of an elastomeric material to the coupling sleeve 3, which is made of a material such as plastic or nylon. A coupling hub 4 made of steel is pressed into the coupling sleeve. The coupling hub 4 is provided with external teeth 5 and internal splines 6. By means of an annular collar or shoulder 7 which is adjacent to an annular offset surface 8 of the hub 4 the latter is precisely positioned within the coupling sleeve 3 and is secured against axial displacement by means of a retaining ring 9.

The external circumference of the fastening flange 1 is only slightly larger than that of the elastomeric element 2. The fastening openings 10 for the screws, which are not shown, are therefore situated inside the external diameter of the elastomeric element 2 and within the area of material recesses 11 of the annular elastomeric element and of the coupling sleeve 3.

For assembly, the coupling shown in the figures of the drawing is then, as a completely preassembled unit, screwed onto a flywheel of the drive engine. To facilitate connection to a unit to be driven, the shaft of a driven unit having external teeth is inserted into the internally splined central opening of the coupling hub 4. The unit to be driven, for example a pump, can then be positioned and firmly connected to the housing of the drive engine via a bell housing or plate arrangement. Thus, further assembly operations, especially those which are difficult to carry out because of tight space clearances, are avoided.

The present invention has been shown and described in what is considered to be the most practical and preferred embodiment. It is anticipated, however, that departures may be made therefrom and that obvious modifications will be implemented by persons skilled in the art.

What is claimed is:

1. An insertable axially, radially and angularly movable toothed coupling which enables the elastic transfer of torque from a drive engine to a machine shaft which to be driven, the coupling comprising:

a) a fastening flange adapted to be mounted to the drive engine; an annular element made of elastomeric material and connected to the fastening flange; an internally splined coupling sleeve having teeth connected to the annular flange; and b) a coupling hub made of steel and including external teeth, which are pressed into engagement with the teeth of said coupling sleeve, said coupling hub including internal splines, which are form-fittingly and detachably connectable to the shaft of the machine to be driven.

2. The coupling of claim 1, wherein said coupling sleeve includes at least one of plastic and nylon.

3. A coupling in accordance with claim 1, wherein coupling sleeve recesses are provided at the external circumference of said annular elastomeric element to accommodate fastening screws for attaching said fastening flange of said coupling.

4. An insertable axially and angularly movable toothed coupling which enables the elastic transfer of torque from a drive engine to a machine which is to be driven, the coupling comprising:

a fastening flange having an elastomeric annular element which is subjected to torsional shear during operation of said coupling, said annular element extending axially from said fastening flange, said fastening flange being mounted to said drive engine;

a coupling sleeve connected to said fastening flange by said annular element, said coupling sleeve having an internal bore provided with a plurality of splines; and a coupling hub having a plurality of teeth which are pressed into engagement with said splines of said coupling sleeve, said coupling hub further having an internal bore including a plurality of splines to connect form-fittingly and detachably to a shaft of the machine to be driven.

5. The coupling of claim 4, wherein said coupling sleeve is fabricated from plastic and said coupling hub is fabricated from steel.

6. The coupling of claim 4, wherein coupling sleeve recesses are provided at the external circumference of said annular elastomeric element to accommodate fastening screws for attaching said fastening flange of said coupling.

7. An insertable axially, radially and angularly movable toothed coupling which enables the elastic transfer of torque from a drive engine to a machine shaft which is to be driven, the coupling comprising:

a) a fastening flange adapted to be mounted to the drive engine; an annular element made of elastomeric material and connected to the fastening flange, and including at least one recess; an internally splined coupling sleeve connected to the annular flange; and b) a coupling hub made of steel and including external teeth, which grip teeth of said coupling sleeve, said coupling hub including internal splines, which arc form-fittingly and detachably connectable to the shaft of the machine to be driven.

8. An insertable axially and angularly movable toothed coupling which enables the elastic transfer of torque from a drive engine to a machine which is to be driven, the coupling comprising:

a fastening flange having an elastomeric annular element which is subjected to torsional shear during operation of said coupling, said annular element extending axially from said fastening flange and including at least one recess, said fastening flange being mounted to said drive engine;

a coupling sleeve connected to said fastening flange by said annular elements, said coupling sleeve having an internal bore provided with a plurality of splines; and a coupling hub having a plurality of teeth engageable with said splines of said coupling sleeve, said coupling hub further having an internal bore including a plurality of splines to connect form-fittingly and detachably to a shaft of the machine to be driven.

* * * * *